(12) United States Patent
Morishige et al.

(10) Patent No.: US 12,358,060 B2
(45) Date of Patent: Jul. 15, 2025

(54) CUTTING TOOL

(71) Applicant: Sumitomo Electric Hardmetal Corp., Itami (JP)

(72) Inventors: Kazunori Morishige, Itami (JP); Katsuya Nakakihara, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 109 days.

(21) Appl. No.: 17/768,480

(22) PCT Filed: Apr. 5, 2021

(86) PCT No.: PCT/JP2021/014488
§ 371 (c)(1),
(2) Date: Apr. 13, 2022

(87) PCT Pub. No.: WO2022/215114
PCT Pub. Date: Oct. 13, 2022

(65) Prior Publication Data
US 2024/0293877 A1 Sep. 5, 2024

(51) Int. Cl.
*B23C 5/00* (2006.01)
*B23C 5/10* (2006.01)

(52) U.S. Cl.
CPC ........... *B23C 5/006* (2013.01); *B23C 5/109* (2013.01); *B23C 2210/168* (2013.01); *B23C 2210/282* (2013.01)

(58) Field of Classification Search
CPC ... B23C 5/006; B23C 5/109; B23C 2210/168; B23C 2210/282; B23C 2200/367; B23C 2250/16
See application file for complete search history.

(56) References Cited

U.S. PATENT DOCUMENTS 4,681,485 A * 7/1987 Koelewijn .............. B23C 5/109
407/53
4,790,693 A * 12/1988 Koblesky ............... B23C 5/109
407/42
7,625,156 B2 * 12/2009 Pantzar ................... B23C 5/109
407/34
(Continued)

FOREIGN PATENT DOCUMENTS

DE 102012022612 A1 * 5/2013 ............. B23C 5/109
JP 61-199314 U 12/1986
(Continued)

*Primary Examiner* — Sara Addisu
(74) *Attorney, Agent, or Firm* — XSENSUS LLP

(57) ABSTRACT

A cutting tool includes a main body. The main body includes a distal end surface, a rear end surface, and a side surface. A spiral first groove and a spiral second groove are formed on the side surface of the main body. The first groove has at least four installation surfaces. The first installation surface is located on a most rear end surface side. The second installation surface is located closer to a distal end surface side with respect to the first installation surface. A length from the first installation surface to the second groove in a circumferential direction along the rotation direction of the main body is set to a first length. A length from the second installation surface to the second groove in the circumferential direction is set to a second length. The first length is longer than the second length.

17 Claims, 10 Drawing Sheets

(56) References Cited

U.S. PATENT DOCUMENTS

| | | | |
|---|---|---|---|
| 7,753,625 B2* | 7/2010 | Craig | B23C 5/109 407/113 |
| 10,124,423 B2* | 11/2018 | Otsuka | B23C 5/202 |
| 2010/0061813 A1* | 3/2010 | Horiike | B23C 5/202 407/42 |
| 2012/0051851 A1* | 3/2012 | Saito | B23C 5/109 407/115 |
| 2016/0031020 A1* | 2/2016 | Francis | B24B 3/021 451/48 |
| 2017/0197257 A1 | 7/2017 | Aso | |
| 2017/0239736 A1* | 8/2017 | Burtscher | B23C 5/109 |
| 2018/0050397 A1* | 2/2018 | Fraese | B23C 5/2208 |
| 2018/0071840 A1 | 3/2018 | Suzuki et al. | |
| 2020/0198019 A1 | 6/2020 | Tanaka et al. | |
| 2021/0001415 A1 | 1/2021 | Kawanami et al. | |
| 2021/0101214 A1* | 4/2021 | Fraese | B05B 1/14 |

FOREIGN PATENT DOCUMENTS

| | | |
|---|---|---|
| JP | 1-79510 U | 5/1989 |
| JP | 1-41527 Y2 | 12/1989 |
| JP | 4-183512 A | 6/1992 |
| JP | 8-1426 A | 1/1996 |
| JP | 2004-510594 A | 4/2004 |
| JP | 2012-20394 A | 2/2012 |
| JP | 2014-83629 A | 5/2014 |
| JP | 2016-190274 A | 11/2016 |
| WO | 99/54078 A1 | 10/1999 |
| WO | 02/28604 A1 | 4/2002 |
| WO | 2005/032776 A1 | 4/2005 |
| WO | 2005/058534 A1 | 6/2005 |
| WO | 2009/105408 A2 | 8/2009 |
| WO | 2015/098973 A1 | 7/2015 |
| WO | 2019/030862 A1 | 2/2019 |
| WO | 2019/163677 A1 | 8/2019 |

* cited by examiner

CUTTING TOOL

CROSS-REFERENCE TO RELATED APPLICATION

The present application is based on PCT filing PCT/JP2021/014488, filed Apr. 5, 2021, the entire contents of which are incorporated herein by reference.

TECHNICAL FIELD

The present disclosure relates to a cutting tool.

BACKGROUND ART

Conventionally, there has been known a cutting tool including a rotatable main body and a plurality of cutting inserts disposed on wall surfaces of chip discharge grooves formed on an outer periphery of the main body (for example, see Japanese Patent Laying-Open No. 2016-190274).

CITATION LIST

Patent Literature

PTL 1: Japanese Patent Laying-Open No. 2016-190274

SUMMARY OF INVENTION

A cutting tool according to one aspect of the present disclosure is a cutting tool rotatable about a rotation axis, and includes a main body. The main body includes a distal end surface, a rear end surface, and a side surface. The side surface is continuous to the distal end surface. The rear end surface is continuous to the side surface and is located on the side opposite to the distal end surface in a direction along the rotation axis. A spiral first groove and a spiral second groove are formed on the side surface of the main body. The second groove is adjacent to the rear side in a rotation direction of the main body when viewed from the first groove. The first groove has at least four installation surfaces inside the first groove. The at least four installation surfaces are used to install a cutting insert. The at least four installation surfaces include a first installation surface and a second installation surface that are disposed third or later from the distal end surface side of the main body. The first installation surface is located on a most rear end surface side among the at least four installation surfaces. The second installation surface is located closer to a distal end surface side with respect to the first installation surface. The at least four installation surfaces have fixing holes fixing the cutting insert, respectively. In the at least four installation surfaces, a center of each fixing hole is set to a center of each of the at least four installation surfaces. In a first section that passes through the center of the first installation surface and is perpendicular to the rotation axis, an intersection of a side surface and a semi-straight line that passes through the center of the first installation surface and extends toward the outside of the side surface with the rotation axis as a start point is set to a first start point. In the first section, an intersection between the side wall of the second groove on the first groove side and the side surface is set to a first end point. A length of the side surface of the main body from the first start point to the first end point in the first section is set to a first length. In a second section that passes through the center of the second installation surface and is perpendicular to the rotation axis, an intersection of the side surface and a semi-straight line that passes through the center of the second installation surface and extends toward the outside of the side surface with the rotation axis as a start point is set to a second start point. In the second section, an intersection between the side wall of the second groove on the first groove side and the side surface is set to a second end point. A length of the side surface of the main body from the second start point to the second end point in the second section is set to a second length. In this case, the first length is longer than the second length.

DETAILED DESCRIPTION

Figure 1:
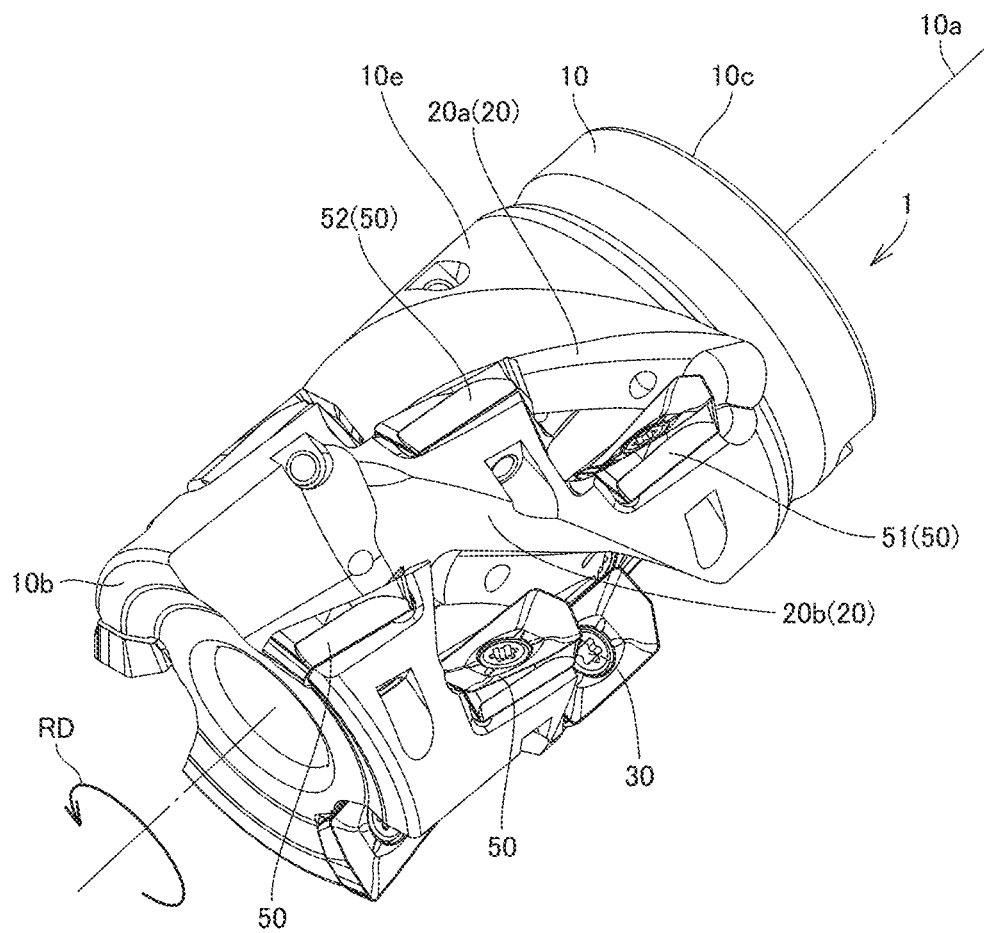
FIG. 1 is a schematic perspective view illustrating a cutting tool according to a first embodiment of the present disclosure.

Problem to be Solved by the Present Disclosure

In a conventional cutting tool, vibration (what is called chatter vibration) during cutting is prevented by adjusting disposition of the cutting insert. However, there is a limit to the prevention of the chatter vibration by adjusting the disposition of the cutting insert.

The present disclosure has been made to solve the above problem. More specifically, the present invention provides a cutting tool capable of preventing the chatter vibration during the cutting.

Advantageous Effect of the Present Disclosure

According to the cutting tool of the present disclosure, the chatter vibration during the cutting can be prevented.

DESCRIPTION OF EMBODIMENTS

An embodiment of the present disclosure will first be described.

(1) A cutting tool according to one aspect of the present disclosure is a cutting tool rotatable about a rotation axis, and includes a main body. The main body includes a distal end surface, a rear end surface, and a side surface. The side surface is continuous to the distal end surface. The rear end surface is continuous to the side surface and is located on the side opposite to the distal end surface in a direction along the rotation axis. A spiral first groove and a spiral second groove are formed on the side surface of the main body. The second groove is adjacent to the rear side in a rotation direction of the main body when viewed from the first groove. The first groove has at least four installation surfaces inside the first groove. The at least four installation surfaces are used to install a cutting insert. The at least four installation surfaces include a first installation surface and a second installation surface that are disposed third or later from the distal end surface side of the main body. The first installation surface is located on a most rear end surface side among the at least four installation surfaces. The second installation surface is located closer to a distal end surface side with respect to the first installation surface. The at least four installation surfaces have fixing holes fixing the cutting insert, respectively. In the at least four installation surfaces, a center of each fixing hole is set to a center of each of the at least four installation surfaces. In a first section that passes through the center of the first installation surface and is perpendicular to the rotation axis, an intersection of a side surface and a semi-straight line that passes through the center of the first installation surface and extends toward the outside of the side surface with the rotation axis as a start point is set to a first start point. In the first section, an intersection between the side wall of the second groove on the first groove side and the side surface is set to a first end point. A length of the side surface of the main body from the first start point to the first end point in the first section is set to a first length. In a second section that passes through the center of the second installation surface and is perpendicular to the rotation axis, an intersection of the side surface and a semi-straight line that passes through the center of the second installation surface and extends toward the outside of the side surface with the rotation axis as a start point is set to a second start point. In the second section, an intersection between the side wall of the second groove on the first groove side and the side surface is set to a second end point. A length of the side surface of the main body from the second start point to the second end point in the second section is set to a second length. In this case, the first length is longer than the second length.

At this point, chip clogging is difficult to generate toward the rear end surface side of the first groove. That is, because a bottom surface of the workpiece is on the distal end surface side, a space in which the chip generated from the cutting insert is discharged is relatively small. Regarding the cutting insert second from the distal end surface side in the first groove, because a portion holding the cutting insert on the distal end surface side exists in the main body, a space in which the chip is discharged is relatively small. For this reason, the first and second cutting inserts from the distal end surface side are likely to be clogged with the chip. On the other hand, with respect to the cutting insert disposed third or later from the distal end surface side in the first groove, even when capacity of the space in which the chip is discharged is about the same as capacity of the space related to the cutting insert on the distal end surface side described above, sometimes the chip accumulate downward (on the distal end surface side) due to gravity. For this reason, the chip is easily clogged toward the distal end surface side of the main body. In addition, the surface (upper surface) of the workpiece is located on the rear end surface side of the first groove, and a sufficient space can be secured behind the surface. For this reason, the chip is relatively less likely to be clogged on the rear end surface side of the first groove than on the distal end surface side. Thus, the width of the groove can be made smaller in a region closer to the rear end surface in the first groove and the second groove. As a result, the first length of the first cutting insert located on the rear end surface side of the first groove can be longer than the second length of the second cutting insert That is, a volume of the portion of the main body supporting the first cutting insert can be made larger than a volume of the portion of the main body supporting the second cutting insert. As a result, the rigidity of the main body can be enhanced by increasing the volume of the main body as compared with a case where the first groove and the second groove have substantially the same width over the entire extending direction. Thus, the chatter vibration during the cutting can be prevented.

(2) (1) In the cutting tool, when the main body is viewed from a direction that is perpendicular to the rotation axis and is parallel to the second installation surface, an angle formed by a line segment connecting the center of the first installation surface and the center of the second installation surface and the rotation axis may be set as an insert disposition angle. When the main body is viewed from the direction that is perpendicular to the rotation axis and is parallel to the second installation surface, an angle formed by the rotation axis and a line segment connecting a first point and a second point at a sidewall upper end of the first groove located on the front side in the rotation direction with respect to the first installation surface may be set to a groove angle, the center of the first installation surface and a position of the first point in the direction along the rotation axis are the same and the center of the second installation surface and a position of the second point in the direction along the rotation axis are the same. In this case, the groove angle may be larger than the insert disposition angle.

In this case, the sidewall upper end of the first groove comes closer to the first cutting insert and the second cutting insert side toward the rear end surface side of the main body. As a result, the width of the first groove becomes narrower toward the rear end surface side. Thus, the volume of the portion of the main body supporting the first cutting insert can be easily made larger than the volume of the portion of the main body supporting the second cutting insert.

(3) In the cutting tool of (1) or (2), when the main body is viewed from a direction that is perpendicular to the rotation axis and is parallel to the first installation surface, a shortest distance from the center of the first installation surface to the sidewall upper end of the first groove located on a front side in a rotation direction of the main body with respect to the first installation surface may be set to a first width. When the main body is viewed from a direction that is perpendicular to the rotation axis and is parallel to the second installation surface, the shortest distance from the center of the second installation surface to the sidewall upper end of the first groove may be set to a second width. The first width may be smaller than the second width.

In this case, the width (first width) of the first groove in the portion where the first cutting insert is disposed is smaller than the width (second width) of the first groove in the portion where the second cutting insert is disposed. Thus, the volume of the portion of the main body supporting the first cutting insert can be easily made larger than the volume of the portion of the main body supporting the second cutting insert.

(4) The cutting tool of (1) to (3) may further include at least four cutting inserts that are disposed inside the first groove and disposed on at least four installation surfaces, respectively. The at least four cutting inserts may include a first cutting insert and a second cutting insert. The first cutting insert may be installed on the first installation surface. The second cutting insert may be installed on the second installation surface. Each of the at least four cutting inserts may have a rake surface facing the front side in the rotation direction in the main body and a flank surface continuous to the rake surface on the side surface side of the main body. Each of the ridgelines of the rake surface and the flank surface may be a cutting edge. When the main body is viewed from the direction that is perpendicular to the rotation axis and is parallel to the first installation surface, an angle formed between the rotation axis and a tangent on the distal end surface side of the cutting edge of the first cutting insert may be set to a first axial rake angle. When the main body is viewed from the direction that is perpendicular to the rotation axis and is parallel to the second installation surface, an angle formed between the rotation axis and a tangent on the distal end surface side of the cutting edge of the second cutting insert may be set to a second axial rake angle. In this case, the first axial rake angle may be smaller than the second axial rake angle.

In this case, the chip flows easily to the distal end surface side of the main body by reducing the axial rake angle of the first cutting insert located on the rear end surface side in the first groove, and as a result, the generation of burrs can be prevented. Furthermore, the chips are difficult to clog in the region on the rear end surface side in the first groove, the generation of the burrs can be prevented while the generation of the chip clogging is prevented.

(5) In the cutting tools of (1) to (4), the first groove may intersect the distal end surface. The edge of the first groove in the distal end surface may have a curved shape protruding toward the rotation axis side. The edge may include a first region located on a side closer to the at least four installation surfaces and a second region located on a side farther from the at least four installation surfaces than the first region. The curvature of the first region may be larger than the curvature of the second region.

In this case, on the distal end surface side of the main body, the chips generated by cutting of the cutting insert can be quickly flowed along the inner surface of the first groove. For this reason, the generation of the chip clogging can be prevented on the distal end surface side of the main body.

Details of Embodiments

With reference to the drawings, an embodiment of the present disclosure will be described in detail. In the following drawings, the same or corresponding component is designated by the same reference numeral, and the overlapping description will be omitted.

First Embodiment

<Configuration of Cutting Tool>

Figure 2:
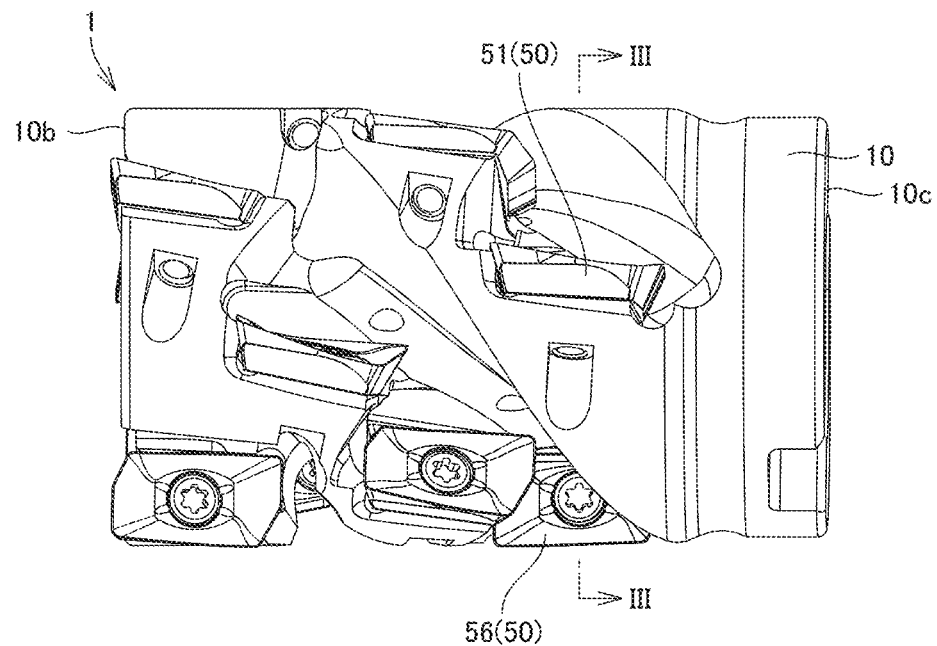
FIG. 2 is a schematic side view illustrating the cutting tool in FIG. 1.
Figure 3:
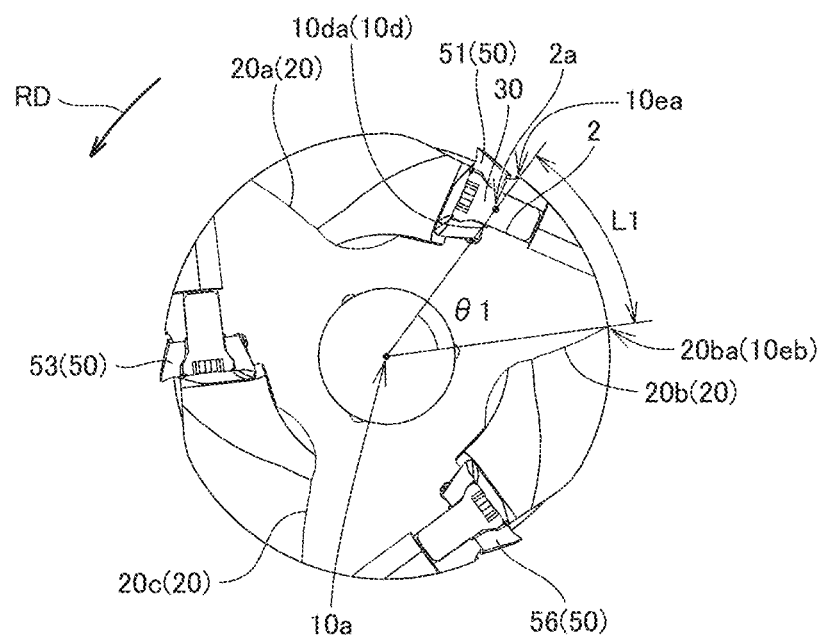
FIG. 3 is a schematic sectional view taken along a line III-III in FIG. 2.
Figure 4:
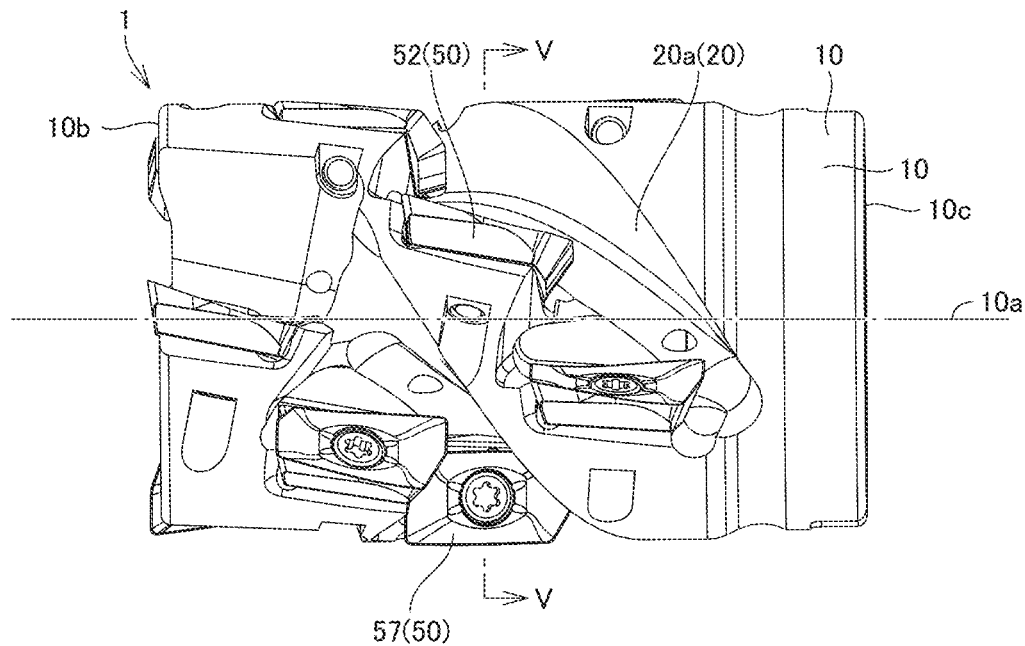
FIG. 4 is a schematic side view illustrating the cutting tool in FIG. 1.
Figure 5:
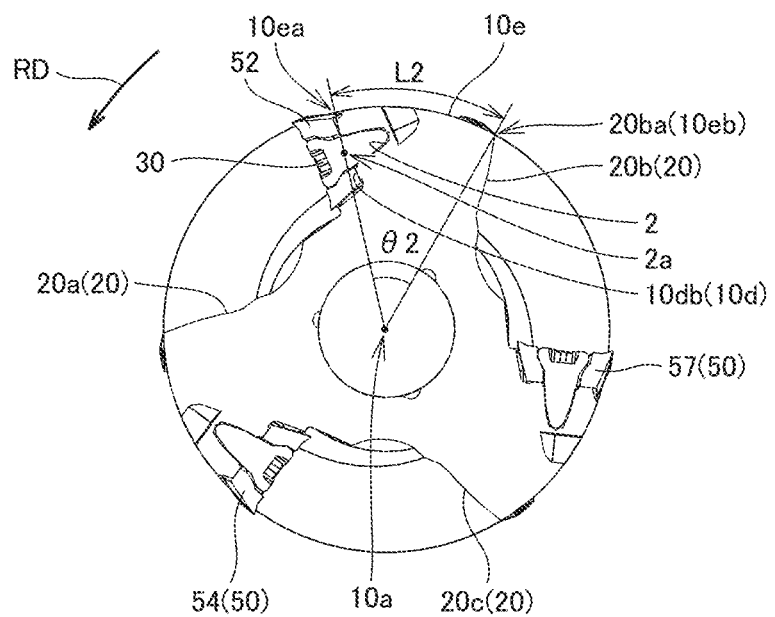
FIG. 5 is a schematic sectional view taken along a line V-V in FIG. 4.
Figure 6:
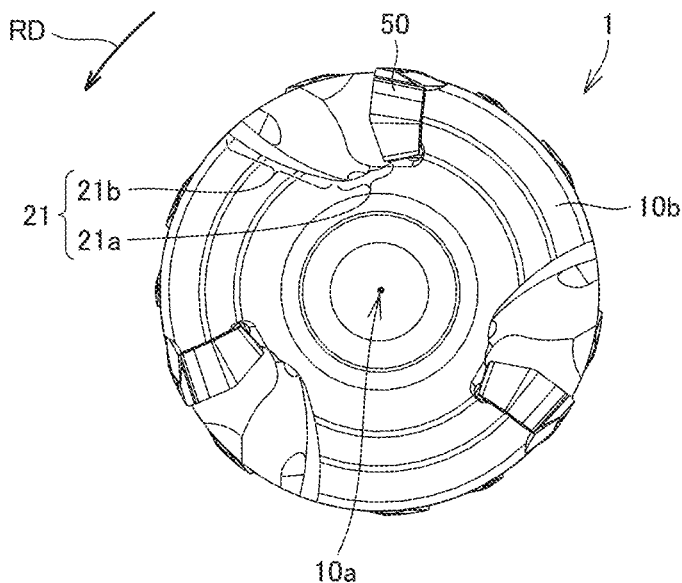
FIG. 6 is a schematic front view illustrating the cutting tool in FIG. 1 when viewed from a distal end surface side.
Figure 7:
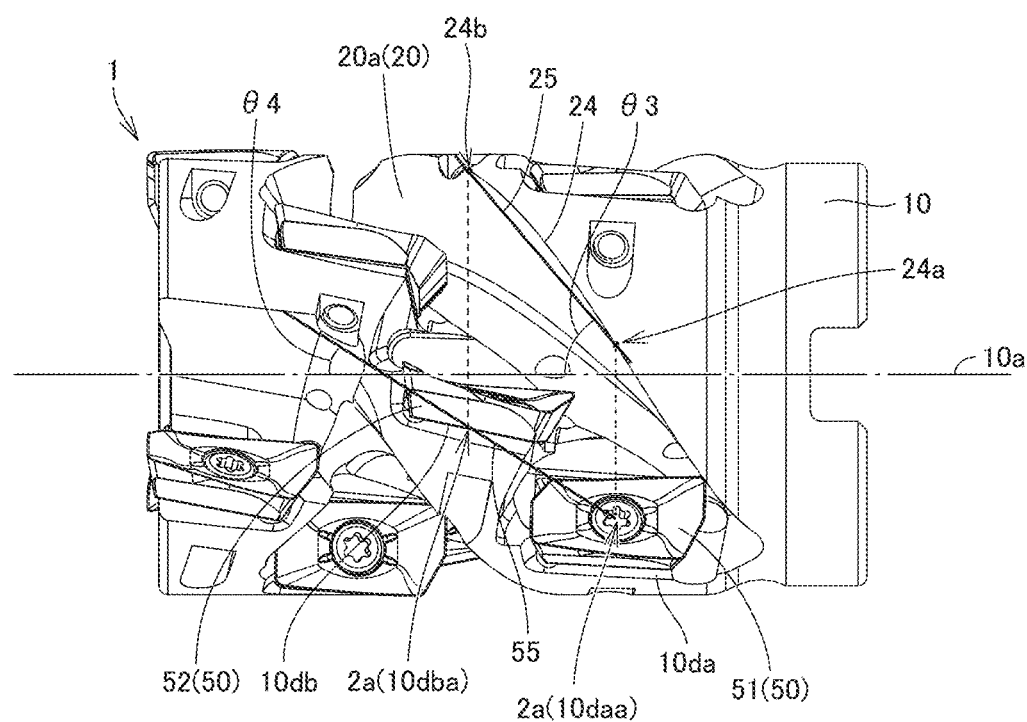
FIG. 7 is a schematic side view illustrating a configuration of the cutting tool in FIG. 1.
Figure 8:
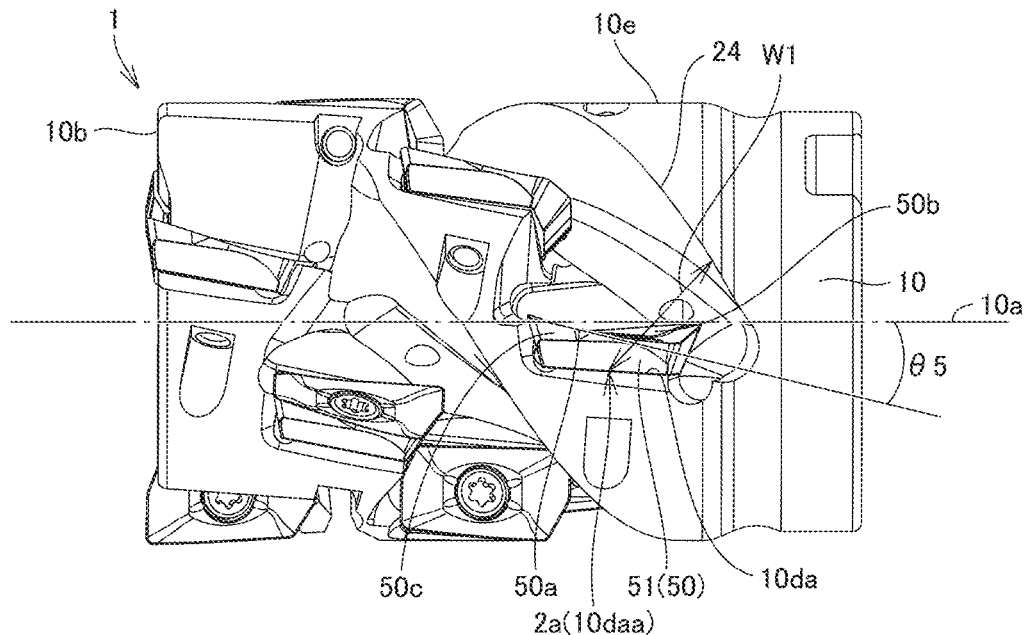
FIG. 8 is a schematic side view illustrating an axial rake angle of the cutting tool in FIG. 1.
Figure 9:
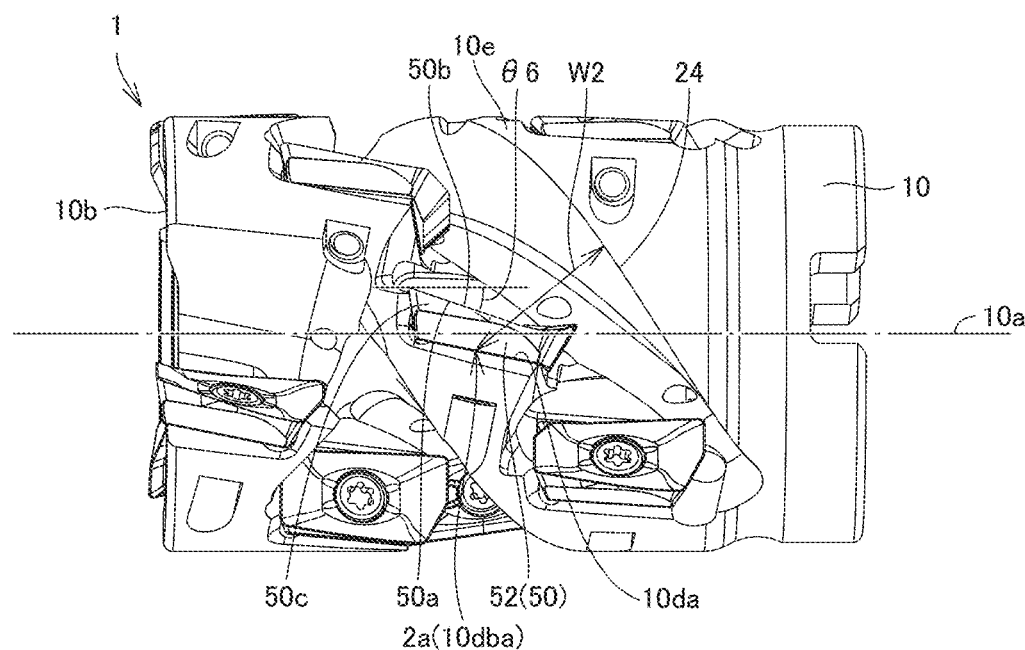
FIG. 9 is a schematic side view illustrating the axial rake angle of the cutting tool in FIG. 1.

FIG. 1 is a schematic perspective view illustrating a cutting tool according to a first embodiment of the present disclosure. FIGS. 2 and 4 are schematic side views illustrating the cutting tool in FIG. 1. FIG. 3 is a schematic sectional view taken along a line III-III in FIG. 2. FIG. 5 is a schematic sectional view taken along a line V-V in FIG. 4. FIG. 6 is a schematic front view illustrating the cutting tool in FIG. 1 when viewed from a distal end surface side. FIG. 7 is a schematic side view illustrating a configuration of the cutting tool in FIG. 1. FIG. 8 is a schematic side view illustrating an axial rake angle of the cutting tool in FIG. 1. FIG. 9 is a schematic side view illustrating the axial rake angle of the cutting tool in FIG. 1.

As illustrated in FIGS. 1 to 9, a cutting tool 1 according to one aspect of the present disclosure includes a main body 10 and at least four cutting inserts 50. Main body 10 has a substantially cylindrical shape. Main body 10 is rotatable around a rotation axis 10a. Main body 10 has a distal end surface 10b, a rear end surface 10c, and a side surface 10e. Rear end surface 10c is located on an opposite side to distal end surface 10b Side surface 10e is an outer peripheral surface that connects distal end surface 10b and rear end surface 10c.

A plurality of spiral grooves 20 are formed on side surface 10e of main body 10. Specifically, a first groove 20a, a second groove 20b, and a third groove 20c are formed on side surface 10e Second groove 20b is adjacent to a rear side of main body 10 in a rotation direction RD at intervals when viewed from first groove 20a. Third groove 20c is adjacent to a front side of main body 10 in rotation direction RD at intervals when viewed from first groove 20a. In cutting tool 1 of FIGS. 1 to 9, three grooves 20 are formed in main body 10. However, a number of grooves 20 may be at least four or two.

At least four cutting inserts 50 are disposed in each of first groove 20a, second groove 20b, and third groove 20c. Inside first groove 20a, at least four cutting inserts 50 include a first cutting insert 51 and a second cutting insert 52 that are disposed third or later from the side of distal end surface 10b of main body 10.

As illustrated in FIG. 1 and the like, first cutting insert 51 is located on the side of most rear end surface 10c in at least four cutting inserts 50. Second cutting insert 52 is located closer to the side of distal end surface 10b than first cutting insert 51. In cutting tool 1, second cutting insert 52 is a cutting insert disposed second from the side of rear end surface 10c.

A plurality of installation surfaces on which cutting insert 50 is installed are formed on the inner surface of first groove 20a. The plurality of installation surfaces may be a planar shape. The plurality of installation surfaces are formed so as to face the front side in rotation direction RD of the main body 10 in first groove 20a. Specifically, a first installation surface 10da is formed in a region on the side of rear end surface 10c of first groove 20a. First cutting insert 51 is installed on first installation surface 10da of main body 10. Specifically, a fixing hole 2 that is a screw bole is made in first installation surface 10da Fixing hole 2 is made so as to extend in a direction (circumferential direction) along rotation direction RD of main body 10. A through-hole into which a fixing screw 30 is inserted is made in first cutting insert 51. First cutting insert 51 is disposed on first installation surface 10da such that the through-hole and fixing hole 2 overlap each other. Fixing screw 30 is inserted into and fixed to fixing hole 2 through the through-hole of first cutting insert 51. In this manner, first cutting insert 51 is fixed to first installation surface 10da by fixing screw 30.

In first groove 20a, a second installation surface 10db is formed on the side of distal end surface 10b with respect to first installation surface 10da. Second cutting insert 52 is installed on second installation surface 10db of main body 10.

FIG. 3 is a schematic sectional view illustrating cutting tool 1 in a first section that passes through a center 2a of first installation surface 10da and is perpendicular to rotation axis 10a. As illustrated in FIG. 3, a length from first installation surface 10da to second groove 20b in the circumferential direction along rotation direction RD of main body 10 is set to a first length L1. Specifically, a section that passes through center 2a of first installation surface 10da and is perpendicular to rotation axis 10a is considered. In the section, an intersection between a semi-straight line that passes through center 2a of first installation surface 10da and extends toward the outside of side surface 10e with rotation axis 10a as a start point and the outermost periphery of a trajectory of side surface 10e when main body 10 rotates about rotation axis 10a is set to a start point 10ea. Center 2a is a center point of fixing hole 2 on first installation surface 10da. In the section, an intersection between a line segment connecting an intersection line (intersection 20ba) between the side wall of second groove 20b (side wall on the side of first groove 20a) and side surface 10e of main body 10 and rotation axis 10a and the outermost periphery of the trajectory of side surface 10e is set to an end point 10eb. In the section, a length along side surface 10e from start point 10ea to end point 10eb is set to first length L1. As an index indicating the length from start point 10ea to end point 10eb, an angle (central angle θ1) formed by a line segment connecting rotation axis 10a and center 2a and a line segment connecting rotation axis 10a and intersection 20ba may be used in the cross section.

FIG. 5 is a schematic sectional view illustrating cutting tool 1 in a second section that passes through center 2a of second installation surface 10db and is perpendicular to rotation axis 10a. As illustrated in FIG. 5, a length from second installation surface 10db to second groove 20b in the circumferential direction along rotation direction RD of main body 10 is set to a second length L2. Specifically, a section that passes through center 2a of second installation surface 10db and is perpendicular to rotation axis 10a is considered. In the section, an intersection between a semi-straight line that passes through center 2a of second installation surface 10db and extends toward the outside of side surface 10e with rotation axis 10a as the start point and the outermost periphery of the trajectory of side surface 10e when main body 10 rotates about rotation axis 10a is set to start point 10ea. Center 2a is a center point of fixing hole 2 on second installation surface 10db. In the section, an intersection between a line segment connecting an intersection line (intersection 20ba) between the side wall of second groove 20b (side wall on the side of first groove 20a) and side surface 10e of main body 10 and rotation axis 10a and the outermost periphery of the trajectory of side surface 10e is set to an end point 10eb. In the section, a length along side surface 10e from start point 10ea to end point 10eb is set to second length L2. As the index indicating the length from start point 10ea to end point 10eb, an angle (central angle θ2) formed by the line segment connecting rotation axis 10a and center 2a and the line segment connecting rotation axis 10a and intersection 20ba may be used in the cross section.

In cutting tool 1 of FIGS. 1 to 5, first length L1 is longer than second length L2. Central angle θ1 is larger than central angle θ2. The relationship between the lengths of the portions of main body 10 adjacent to first cutting insert 51 and second cutting insert 52 that are installed in first groove 20a described above (the relationship between first length L1 and second length L2) also bolds for cutting inserts 50 installed in other grooves 20.

As illustrated in FIGS. 1 and 6, in cutting tool 1, first groove 20a intersects distal end surface 10b. When distal end surface 10b is viewed along rotation axis 10a, an edge 21 of first groove 20a in distal end surface 10b has a curved shape protruding toward the side of rotation axis 10a. Specifically, as illustrated in FIG. 6, edge 21 includes a first region 21a and a second region 21b. First region 21a is located on the side close to the plurality of installation surfaces 10d inside first groove 20a. Second region 21b is located farther from the plurality of installation surfaces 10d inside first groove 20a than first region 21a. From another point of view, first region 21a is located on the side close to the plurality of cutting inserts 50 arranged in first groove 20a. Second region 21b is located on the opposite side of the plurality of cutting inserts 50 when viewed from first region 21a. A curvature of first region 21a is larger than a curvature of second region 21b. First region 21a is disposed in the region closer to rotation axis 10a than second region 21b.

When distal end surface 10b is viewed along rotation axis 10a, the shape of edge 21 has a curvature corresponding to a certain point of edge 21. The shape of first region 21a may have substantially the same curvature with respect to all points of first region 21a. The shape of first region 21a may have different curvatures corresponding to points on first region 21a. Similarly, the shape of second region 21b may have substantially the same curvature with respect to all points of second region 21b. Similarly, the shape of second region 21b may have different curvatures corresponding to points on second region 21b. In the present specification, the "curvature" of first region 21a means a range of values of curvature corresponding to all points on first region 21a. Similarly, in the present specification, the "curvature" of second region 21b means a range of values of curvature corresponding to all points on second region 21b.

FIG. 7 is a schematic side view illustrating cutting tool 1 when viewed from a direction that is perpendicular to rotation axis 10a and is parallel to second installation surface 10db. As illustrated in FIG. 7, the direction in which the plurality of cutting inserts 50 are arranged in one groove 20 in cutting tool 1 is different from the extending direction of a sidewall upper end 24 on the front side in rotation direction RD of cutting insert 50 in groove 20. From a different point of view, cutting tool 1 described above has the following features.

As illustrated in FIG. 7, a case where main body 10 is viewed from the direction that is perpendicular to rotation axis 10a and parallel to the second installation surface 10db will be considered. A center 10daa of first installation surface 10da on which first cutting insert 51 is disposed is specified. Center 10daa may be center 2a of fixing hole 2 of first installation surface 10da in FIG. 3. A center 10dba of second installation surface 10db on which second cutting insert 52 is disposed is specified. Center 10dba may be center 2a of fixing hole 2 of second installation surface 10db in FIG. 5. An angle formed by a line segment 55 connecting center 10daa of first installation surface 10da and center 10dba of second installation surface 10db and rotation axis 10a is set to an insert disposition angle θ4.

When main body 10 is viewed from the direction that is perpendicular to rotation axis 10a and is parallel to second installation surface 10db, a first point 24a having the same position in the direction along rotation axis 10a as center 10daa of first installation surface 10da is specified at sidewall upper end 24 of first groove 20a located on the front side in the rotation direction RD of first installation surface 10da.

Second point 24b having the same position in the direction along the rotation axis 10a as center 10dba of second installation surface 10db is specified. An angle formed by a line segment 25 connecting first point 24a and second point 24b and rotation axis 10a is set to a groove angle 63. Groove angle θ3 is larger than insert disposition angle θ4.

FIG. 8 is a schematic side view illustrating cutting tool 1 when viewed from the direction that is perpendicular to rotation axis 10a and is parallel to first installation surface 10da. FIG. 9 is a schematic side view illustrating cutting tool 1 when viewed from the direction that is perpendicular to rotation axis 10a and is parallel to second installation surface 10db. In cutting tool 1 described above, the distance between the plurality of cutting inserts 50 and sidewall upper end 24 of groove 20 decreases toward rear end surface 10c of main body 10. From a different point of view, in cutting tool 1 described above, the distance from first installation surface 10da to sidewall upper end 24 is different from the distance from second installation surface 10db to sidewall upper end 24. That is, as illustrated in FIG. 8, the shortest distance from center 10daa of first installation surface 10da to sidewall upper end 24 of first groove 20a located on the front side in rotation direction RD of main body 10 with respect to first installation surface 10da is set to a first width W1. As illustrated in FIG. 9, the shortest distance from center 10dba of second installation surface 10db to sidewall upper end 24 of first groove 20a is set to a second width W2. First width W1 is smaller than second width W2.

As illustrated in FIG. 3, cutting tool 1 includes a third cutting insert 53 that is disposed inside third groove 200 and disposed so as to have a position overlapping first cutting insert 51 in the direction along rotation axis 10a. As illustrated in FIG. 5, cutting tool 1 includes a fourth cutting insert 54 that is disposed inside third groove 20c and disposed so as to have a position overlapping second cutting insert 52 in the direction along rotation axis 10a.

As illustrated in FIG. 3, cutting tool 1 includes a fifth cutting insert 56 that is disposed inside second groove 20b and disposed so as to have a position overlapping first cutting insert 51 in the direction along rotation axis 10a. As illustrated in FIG. 5, cutting tool 1 includes a sixth cutting insert 57 that is disposed inside second groove 20b and disposed so as to have a position overlapping second cutting insert 52 in the direction along rotation axis 10a. The relationship (corresponding to the relationship between first length L1 and second length L2) between the lengths of the portions of main body 10 adjacent to third cutting insert 53 and fourth cutting insert 54 that are disposed in third groove 20c is the same as the relationship between the lengths of the portions of main body 10 adjacent to first cutting insert 51 and second cutting insert 52 that are disposed in first groove 20a. The relationship (corresponding to the relationship between first length L1 and second length L2) between the lengths of the portions of main body 10 adjacent to fifth cutting insert 56 and sixth cutting insert 57 that are disposed in second groove 20b is the same as the relationship between the lengths of the portions of main body 10 adjacent to first cutting insert 51 and second cutting insert 52 that are disposed in first groove 20a.

As illustrated in FIGS. 8 and 9, in cutting tool 1, each of the plurality of cutting inserts 50 includes a rake surface 50b facing the front side in rotation direction RD in main body 10 and a flank surface 50c continuous to rake surface 50b on the side of side surface 10e of main body 10. Each of the ridgelines of the rake surface 50b and the flank surface 50c is a cutting edge 50a. When main body 10 is viewed from the direction that is perpendicular to rotation axis 10a and is parallel to first installation surface 10da, an angle formed between a tangent on the side of distal end surface 10b of cutting edge 50a of first cutting insert 51 and rotation axis 10a may be set to a first axial rake angle θ5. When main body 10 is viewed from the direction that is perpendicular to rotation axis 10a and is parallel to second installation surface 10db, an angle formed between a tangent on the side of distal end surface 10b of cutting edge 50a of second cutting insert 52 and rotation axis 10a may be set to a second axial rake angle θ6. In this case, first axial rake angle θ5 is smaller than second axial rake angle θ6.

<Effects>

In cutting tool 1, the length from first installation surface 10da on which first cutting insert 51 is disposed to second groove 20b in the circumferential direction along rotation direction RD of main body 10 is set to first length L1. The length from second installation surface 10db on which second cutting insert 52 is disposed to second groove 20b in the circumferential direction is set to second length L2. Cutting tool 1 is configured such that first length L1 is longer than second length L2.

In this way, the volume of the portion (portion of main body 10 supporting first cutting insert 51 from the rear side in rotation direction RD of main body 10) of main body 10 supporting first cutting insert 51 can be made larger than the volume of the portion of main body 10 supporting second cutting insert 52. As a result, the rigidity of main body 10 can be enhanced by increasing the volume of main body 10 as compared with the case where first groove 20a and second groove 20b have substantially the same width over the entire extending direction. Thus, the chatter vibration during the cutting can be prevented.

In cutting tool 1, as illustrated in FIG. 7, groove angle θ3 is larger than insert disposition angle θ4. In this case, sidewall upper end 24 of first groove 20a comes closer to the sides of first cutting insert SI and second cutting insert 52 toward rear end surface 10c of main body 10. As a result, the width of first groove 20a becomes narrower toward rear end surface 10c. Thus, the volume of the portion of main body 10 supporting first cutting insert SI can be easily made larger than the volume of the portion of main body 10 supporting second cutting insert 52. As a result, the rigidity of main body 10 can be enhanced.

In cutting tool 1, as illustrated in FIG. 8, the shortest distance from center 10daa of first installation surface 10da to sidewall upper end 24 of first groove 20a located on the front side in rotation direction RD of main body 10 with respect to first installation surface 10da is set to first width W1. As illustrated in FIG. 9, the shortest distance from center 10dba of second installation surface 10db to sidewall upper end 24 of first groove 20a is set to second width W2. First width W1 is smaller than second width W2. In this case, the width (first width W1) of first groove 20a in the portion where first cutting insert 51 is disposed is smaller than the width (second width W2) of first groove 20a in the portion where second cutting insert 52 is disposed. Thus, the volume of the portion of main body 10 supporting first cutting insert 51 can be easily made larger than the volume of the portion of main body 10 supporting second cutting insert 52. As a result, the rigidity of main body 10 can be enhanced.

In cutting tool 1, third groove 20c is formed in side surface 10e of main body 10. Third groove 20c is adjacent to the front side in rotation direction RD of main body 10 when viewed from first groove 20a. Cutting tool 1 includes third cutting insert 53 that is disposed inside third groove 20c and disposed so as to have the position overlapping first cutting insert 51 in the direction along rotation axis 10a. Cutting tool 1 includes fourth cutting insert 54 that is disposed inside third groove 20c and disposed so as to have the position overlapping second cutting insert 52 in the direction along rotation axis 10a.

In this case, the volume of the portion of main body 10 supporting third cutting insert 53 can be made larger than the volume of the portion of main body 10 supporting fourth cutting insert 54. Thus, the rigidity of main body 10 can be enhanced.

In cutting tool 1, first axial rake angle θ5 with respect to rake surface 50b of first cutting insert 51 is smaller than second axial rake angle θ6 with respect to rake surface 50b of second cutting insert 52. In this case, chips flow easily to the side of distal end surface 10b of main body 10 by reducing first axial rake angle θ5 of first cutting insert 51 located on the side of rear end surface 10c in first groove 20a, and as a result, generation of burrs can be prevented. Furthermore, the chips are difficult to clog in the region on the side of rear end surface 10c in first groove 20a, the generation of the burrs can be prevented while the generation of the chip clogging is prevented.

In cutting tool 1, edge 21 of first groove 20a on distal end surface 10b has a curved shape protruding toward rotation axis 10a. The curvature of first region 21a in edge 21 is larger than the curvature of second region 21b.

In this case, on the side of distal end surface 10b of main body 10, the chips generated by cutting of cutting insert 50 can be quickly flowed along the inner surface of first groove 20a. For this reason, the generation of the chip clogging can be prevented on the distal end surface side of main body 10.

Second Embodiment

Figure 10:
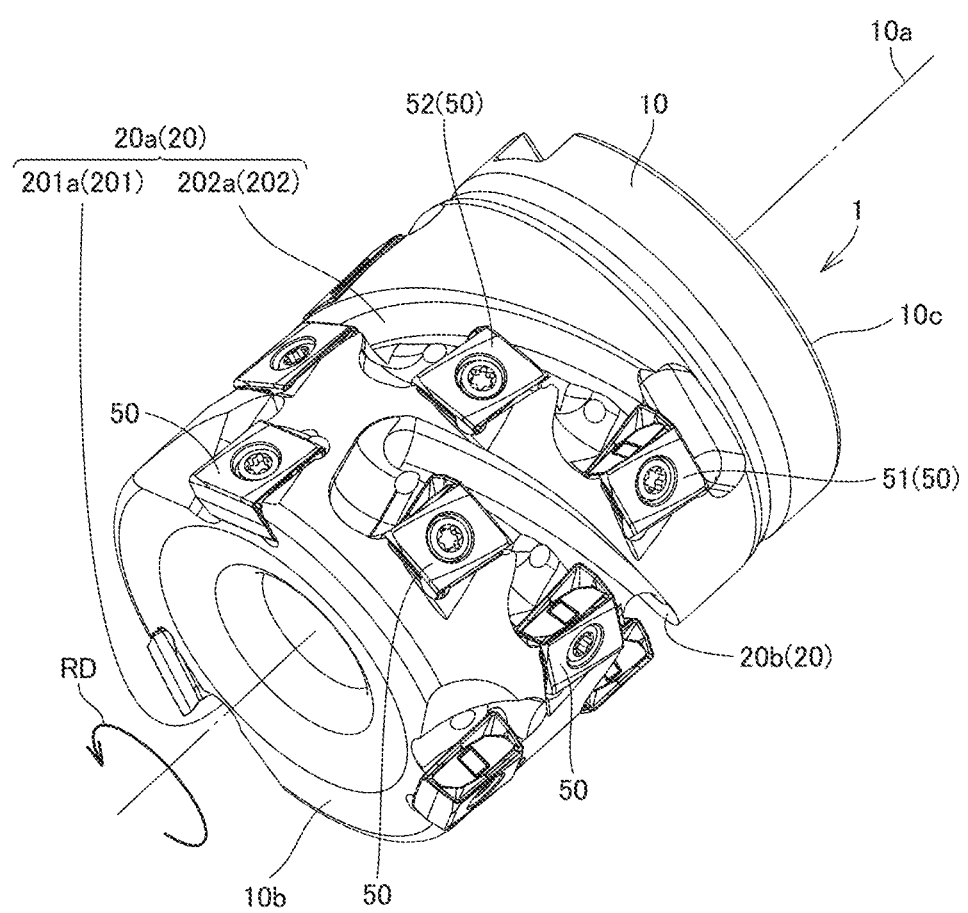
FIG. 10 is a schematic perspective view illustrating a cutting tool according to a second embodiment of the present disclosure.
Figure 11:
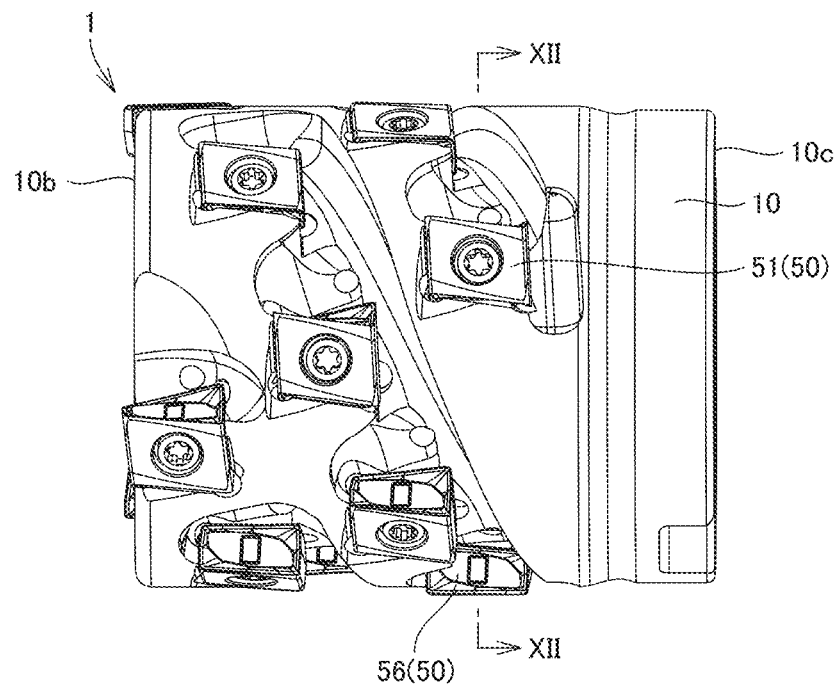
FIG. 11 is a schematic side view illustrating the cutting tool in FIG. 10.
Figure 12:
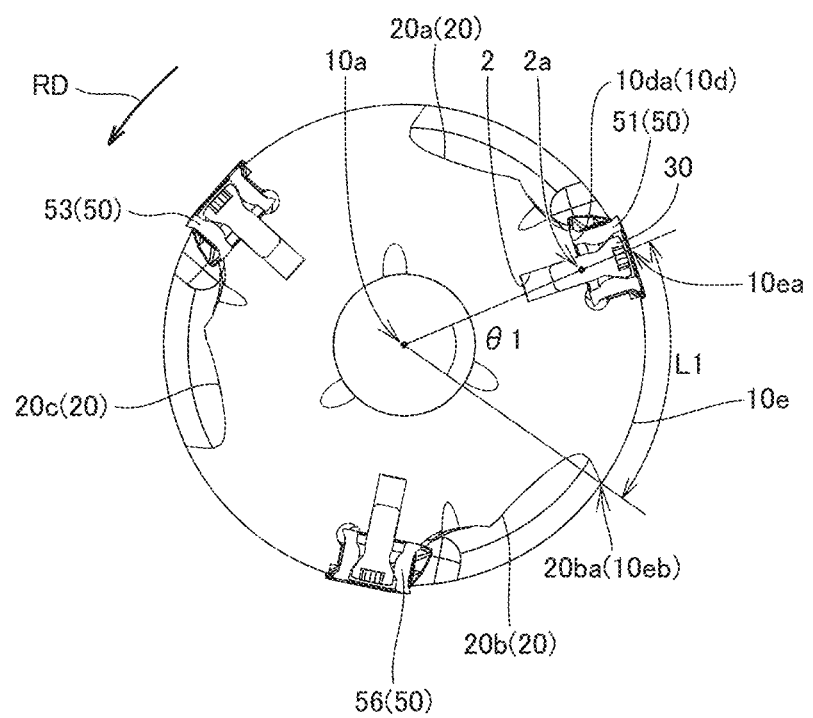
FIG. 12 is a schematic sectional view taken along a line XII-XII in FIG. 11.
Figure 13:
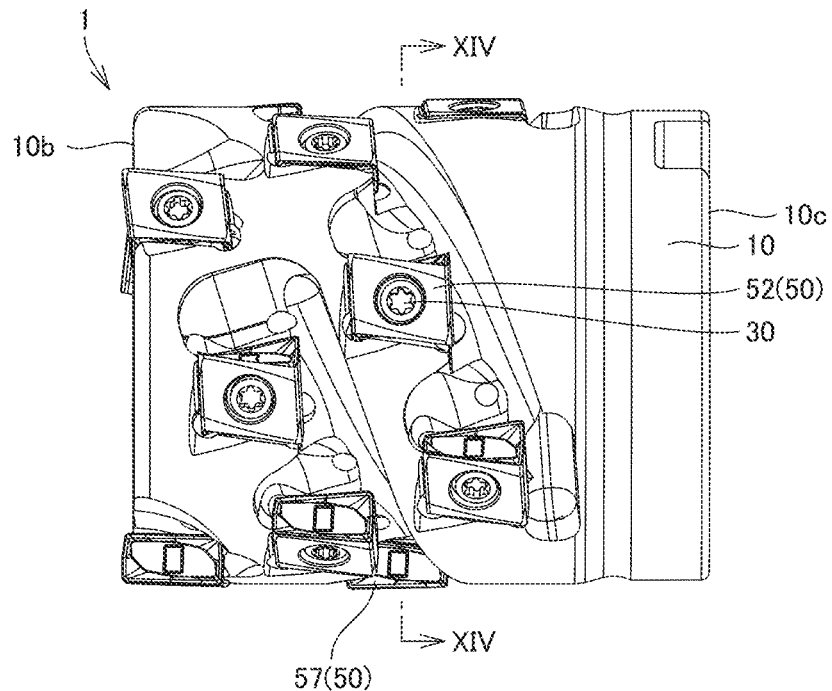
FIG. 13 is a schematic side view illustrating the cutting tool in FIG. 10.
Figure 14:
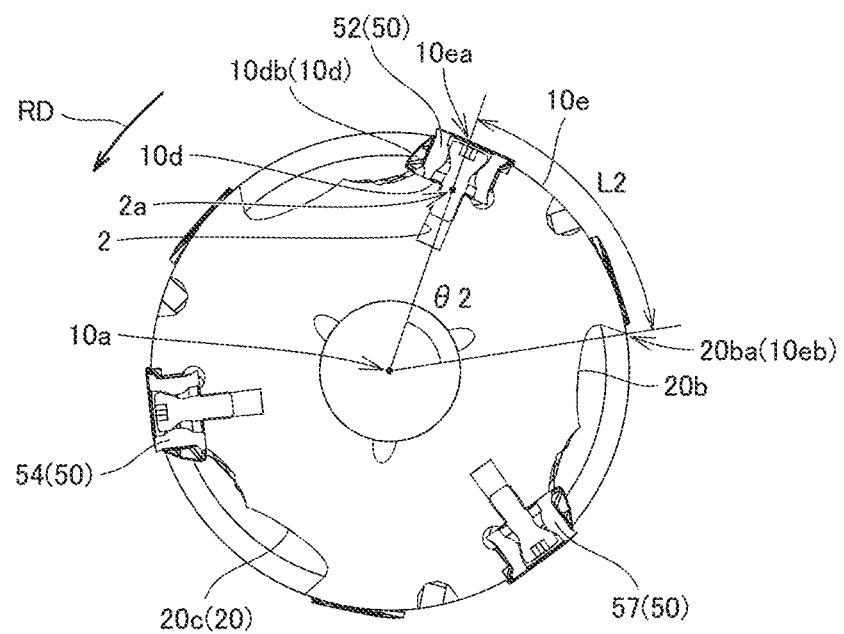
FIG. 14 is a schematic sectional view taken along a line XIV-XIV in FIG. 13.
Figure 15:
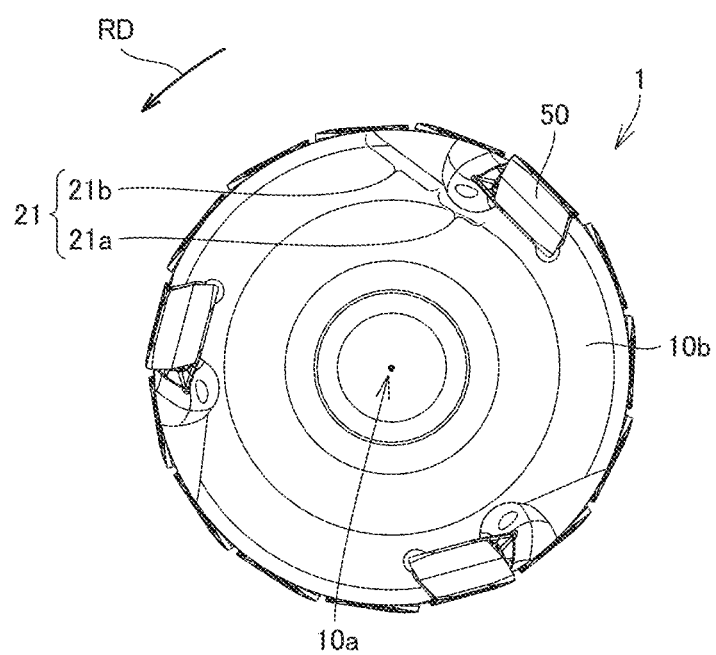
FIG. 15 is a schematic front view illustrating the cutting tool in FIG. 10 when viewed from the distal end surface side.

FIG. 10 is a schematic perspective view illustrating a cutting tool according to a second embodiment of the present disclosure. FIGS. 11 and 13 are schematic side views illustrating the cutting tool in FIG. 10. FIG. 12 is a schematic sectional view taken along a line XII-XII in FIG. 11. FIG. 14 is a schematic sectional view taken along a line XIV-XIV in FIG. 13. FIG. 15 is a schematic front view illustrating the cutting tool in FIG. 10 when viewed from the distal end surface side.

Cutting tool 1 in FIGS. 10 to 15 basically has the same configuration as the cutting tool 1 in FIGS. 1 to 9, but differs from cutting tool 1 in FIGS. 1 to 9 in the shape of groove 20 in main body 10, the structure of cutting insert 50 disposed in groove 20, and the method for fixing cutting insert 50 to main body 10. The details will be described below.

As illustrated in FIGS. 10 to 15, the plurality of spiral grooves 20 are formed on side surface 10e of main body 10. Each of the plurality of grooves 20 is separated into a portion (distal end side groove 201) on the side of distal end surface 10b of main body 10 and a rear end side groove 202 disposed at an interval from the distal end side groove. Specifically, a first groove 20a, a second groove 20b, and a third groove 20c are formed on side surface 10e. First groove 20a includes a distal end side groove 201a and a rear end side groove 202a. In cutting tool 1 of FIGS. 10 to 15, three grooves 20 are formed in main body 10, and the number of grooves 20 may be at least four or two.

At least four cutting inserts 50 are disposed in each of first groove 20a, second groove 20b, and third groove 20c. Specifically, for example, one cutting insert 50 is disposed in distal end side groove 201a of first groove 20a Four cutting inserts 50 are disposed in rear end side groove 202a of first groove 20a. The number of cutting inserts 50 disposed in rear end side groove 202a may be greater than or equal to five or less than or equal to three. The number of cutting inserts 50 disposed in distal end side groove 201a may be at least two Inside first groove 20a, at least four cutting inserts 50 include a first cutting insert 51 and a second cutting insert 52 that are disposed third or later from the side of distal end surface 10b of main body 10.

As illustrated in FIG. 10 and the like, first cutting insert 51 is located closest to the side of rear end surface 10c in the rear end side groove 202a among at least four cutting inserts 50. Second cutting insert 52 is located closer to the side of distal end surface 10b than first cutting insert SI. In illustrated cutting tool 1, second cutting insert 52 is the cutting insert disposed second from the side of rear end surface 10c and fourth from the side of distal end surface 10b.

A plurality of installation surfaces on which cutting insert 50 is installed are formed on the inner surface of first groove 20a. The plurality of installation surfaces 10d are formed so as to face the radial outside of main body 10 in the first groove 20 a. Specifically, as illustrated in FIG. 12, first installation surface 10da is formed in the region on the side of rear end surface 10c of first groove 20a. First installation surface 10da is disposed so as to face the radially outside of main body 10. First cutting insert 5l is installed on first installation surface 10da of main body 10. Specifically, a fixing hole 2 that is a screw hole is made in first installation surface 10da. Fixing hole 2 is formed so as to extend in the direction (radial direction) toward rotation axis 10a of main body 10. A through-hole into which a fixing screw 30 is inserted is made in first cutting insert 51. First cutting insert 51 is disposed on first installation surface 10da such that the through-hole and fixing hole 2 overlap each other. Fixing screw 30 is inserted into and fixed to fixing hole 2 through the through-hole of first cutting insert 51. In this manner, first cutting insert 51 is fixed to first installation surface 10da by fixing screw 30 disposed so as to extend in the radial direction.

In first groove 20a, a second installation surface 10db is formed on the side of distal end surface 10b with respect to first installation surface 10da. Similarly to first installation surface 10da, second installation surface 10db is also disposed so as to face the radial outside of main body 10. Second cutting insert 52 is installed on second installation surface 10db of main body 10. The method for fixing second cutting insert 52 to second installation surface 10db is similar to the method for fixing first cutting insert 51 to first installation surface 10da.

FIG. 12 is a schematic sectional view illustrating cutting tool 1 in a first section that passes through center 2a of first installation surface 10da and is perpendicular to rotation axis 10a. As illustrated in FIG. 12, the length from first installation surface 10da to second groove 20b in the circumferential direction along rotation direction RD of main body 10 is set to first length L1. Specifically, a section that passes through center 2a of first installation surface 10da and is perpendicular to rotation axis 10a is considered. In the section, an intersection between a semi-straight line that passes through center 2a of first installation surface 10da and extends toward the outside of side surface 10e with rotation axis 10a as a start point and the outermost periphery of a trajectory of side surface 10e when main body 10 rotates about rotation axis 10a is set to a start point 10ca. Center 2a is a center point of fixing hole 2 on first installation surface 10da. In the section, an intersection between a line segment connecting an intersection line (intersection 20ba) between the side wall of second groove 20b (side wall on the side of first groove 20a) and side surface 10e of main body 10 and rotation axis 10a and the outermost periphery of the trajectory of side surface 10e is set to an end point 10eb. In the section, a length along side surface 10e from start point 10ca to end point 10eb is set to first length L1. As an index indicating the length from start point 10ea to end point 10eb, an angle (central angle θ1) formed by a line segment connecting rotation axis 10a and center 2a and a line segment connecting rotation axis 10a and intersection 20ba may be used in the cross section.

FIG. 14 is a schematic sectional view illustrating cutting tool 1 in a second section that passes through center 2a of second installation surface 10db and is perpendicular to rotation axis 10a. As illustrated in FIG. 14, the length from second installation surface 10db to second groove 20b in the circumferential direction along rotation direction RD of main body 10 is set to second length L2. Specifically, a section that passes through center 2a of second installation surface 10db and is perpendicular to rotation axis 10a is considered. In the section, an intersection between a semi-straight line that passes through center 2a of second installation surface 10db and extends toward the outside of side surface 10e with rotation axis 10a as the start point and the outermost periphery of the trajectory of side surface 10e when main body 10 rotates about rotation axis 10a is set to start point 10ca. Center 2a is a center point of fixing hole 2 on second installation surface 10db. In the section, an intersection between a line segment connecting an intersection line (intersection 20ba) between the side wall of second groove 20b (side wall on the side of first groove 20a) and side surface 10e of main body 10 and rotation axis 10a and the outermost periphery of the trajectory of side surface 10e is set to an end point 10eb. In the section, a length along side surface 10e from start point 10ea to end point 10eb is set to second length L2. As the index indicating the length from start point 10ea to end point 10eb, the angle (central angle θ2) formed by the line segment connecting rotation axis 10a and center 2a and the line segment connecting rotation axis 10a and intersection 20ba may be used in the cross section.

In cutting tool 1 of FIGS. 10 to 14, first length L1 is longer than second length L2. Central angle θ1 is larger than central angle θ2. The relationship between the lengths of the portions of main body 10 adjacent to first cutting insert 51 and second cutting insert 52 that are installed in first groove 20a described above (the relationship between first length L1 and second length L2) also holds for cutting inserts 50 installed in other grooves 20.

As illustrated in FIGS. 10 and 15, in cutting tool 1, distal end side groove 201a of first groove 20a intersects distal end surface 10b. When distal end surface 10b is viewed along rotation axis 10a, edge 21 of first groove 20a (distal end side groove 201a) in distal end surface 10b includes a curved portion protruding toward the side of rotation axis 10a. Specifically, as illustrated in FIG. 15, edge 21 includes a first region 21a and a second region 21b. First region 21a is located on the side close to the plurality of installation surfaces 10d inside first groove 20a. Second region 21b is located farther from the plurality of installation surfaces 10d inside first groove 20a than first region 21a. From another point of view, first region 21a is located on the side close to the plurality of cutting inserts 50 arranged in first groove 20a. First region 21a has a curved shape protruding toward the side of rotation axis 10a. Second region 21b is located on the opposite side of the plurality of cutting inserts 50 installed in first groove 20a when viewed from first region 21a. Second region 21b has a substantially linear shape. A curvature of first region 21a is larger than a curvature of second region 21b. First region 21a includes a portion closer to rotation axis 10a than second region 21b.

As illustrated in FIG. 12, cutting tool 1 includes third cutting insert 53 that is disposed inside third groove 20c and disposed so as to have the position overlapping first cutting insert 51 in the direction along rotation axis 10a. As illustrated in FIG. 14, cutting tool 1 includes fourth cutting insert 54 that is disposed inside third groove 20c and disposed so as to have the position overlapping second cutting insert 52 in the direction along rotation axis 108.

As illustrated in FIG. 12, cutting tool 1 includes fifth cutting insert 56 that is disposed inside second groove 20b and disposed so as to have the position overlapping first cutting insert 51 in the direction along rotation axis 10a. As illustrated in FIG. 14, cutting tool 1 includes sixth cutting insert 57 that is disposed inside second groove 20b and disposed so as to have the position overlapping second cutting insert 52 in the direction along rotation axis 10a. The relationship (corresponding to the relationship between first length L1 and second length L2) between the lengths of the portions of main body 10 adjacent to third cutting insert 53 and fourth cutting insert 54 that are disposed in third groove 20c is the same as the relationship between the lengths of the portions of main body 10 adjacent to first cutting insert 51 and second cutting insert 52 that are disposed in first groove 20a. The relationship (corresponding to the relationship between first length L1 and second length L2) between the lengths of the portions of main body 10 adjacent to fifth cutting insert 56 and sixth cutting insert 57 that are disposed in second groove 20b is the same as the relationship between the lengths of the portions of main body 10 adjacent to first cutting insert 51 and second cutting insert 52 that are disposed in first groove 20a.

Cutting tool 1 in FIGS. 10 to 15 can also obtain the same effects as those of cutting tool 1 in FIGS. 1 to 9.

EXAMPLE 1

A test was conducted regarding the effect of preventing chatter vibration
<Apparatus and Sample>
For the test, a vertical machining center (NVX5080 manufactured by DMG Mori Seiki Co., Ltd., spindle size BBT50) was used.

S50C classified as a carbon steel material S-C material according to the Japanese Industrial Standard (JIS) G4051: 2016 was used as a material of the workpiece. A square bar was used as the workpiece such that sufficient rigidity can be ensured during cutting. The size of the workpiece was 85 mm×100 mm×300 mm. The workpiece was fixed by holding the side surface with a vice.

Figure 16:
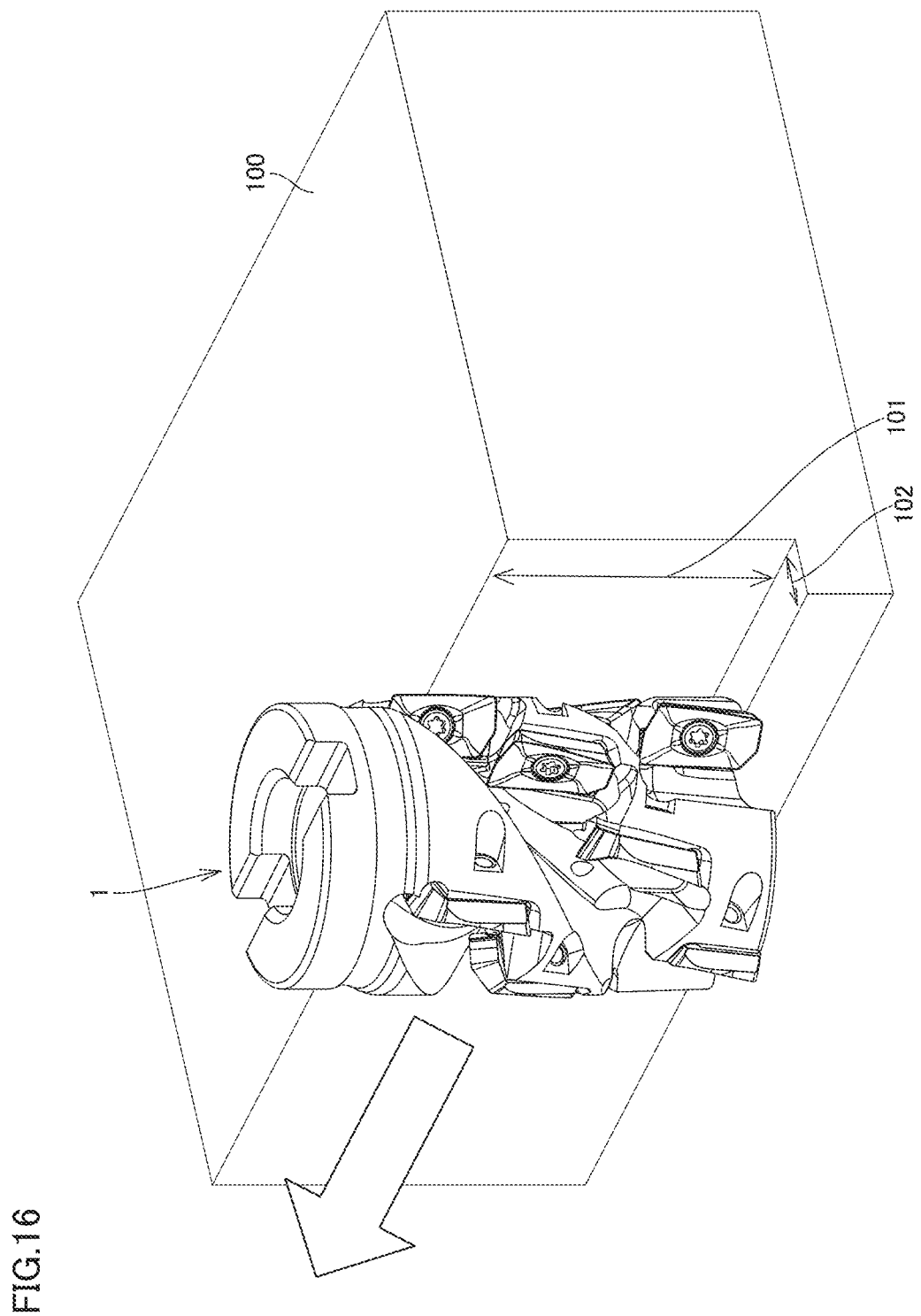
FIG. 16 is a schematic diagram illustrating a test method.

A shank type tool having a tool diameter of 32 mm φ, an effective blade length of 35 mm, the number of effective blades of 3, the total number of blades of 12, and a shank diameter of 32 mm φ was used as the tool. A general-purpose cutting insert having a model number AOMT11T308PEER-G manufactured by Sumitomo Electric Hard Metal Co., Ltd. was used as the cutting insert. The tool of the example has the configuration in FIGS. 1 to 9. As a tool of a comparative example, a tool having the same configuration as the tool of the above example except that central angle θ1 in FIG. 3 and central angle θ2 in FIG. 5 are the same was used.
<Test Method>
FIG. 16 is a schematic diagram illustrating a test method. As illustrated in FIG. 16, tests cutting workpieces 100 with the tools of the example and the comparative example were performed. As cutting conditions, a rotation speed was set to 150 m/min, a feed amount was set to 0.1 mm/blade, and an axial cutting amount 101 was set to 30 mm. The initial value of radial cutting amount 102 was set to 5 mm, and the initial value was increased by 5 mm until the chatter vibration was generated. A tool protrusion length was 60 mm from the holder.

As a cutting method, a downcutting method was adopted as illustrated in FIG. 16. An oil supply method (coolant supply method) during cutting was dry.

As a criterion for determining existence of the chatter vibration, the existence of generation of high sound was used as a criterion. It was determined that the chatter vibration was generated when the high sound was generated.

Under the above cutting conditions, the tool of the example and the tool of the comparative example were used to compare the radial cutting amounts at which the chatter vibration was generated.

<Result>

In the tool of the comparative example, the chatter vibration was not generated when the radial cutting amounts were 5 mm, 10 mm, and 15 mm. However, when the radial cut amount was 20 mm, the chatter vibration was generated. In addition, when the radial cut amount was 25 mm, the chatter vibration was markedly generated.

On the other hand, in the tool of the example, the chatter vibration was not generated when the radial cutting amounts were 5 mm, 10 mm, 15 mm, and 20 mm. When the radial cut amount was 25 mm, the chatter vibration was generated. In addition, when the radial cut amount was 30 mm, the chatter vibration was markedly generated.

As described above, because the tool of the example has the larger radial cutting amount that can be applied without generating the chatter vibration than the tool of the comparative example, it was illustrated that a chatter resistance is high.

EXAMPLE 2

A test was conducted on the relationship between the generation of the burrs and the axial rake angle.
<Apparatus and Sample>

For the test, the same vertical machining center as in the example 1 was used. In addition, the workpiece having the same material and shape as those of the workpiece used in the example 1 was used as the workpiece.

As the tool, a shank type tool having a tool diameter of 25 mm q and a shank diameter of 25 mm q was used. A tool 1 in which the axial rake angle (axial rake) of the cutting insert processing an upper surface portion of the workpiece was 16° and a tool 2 in which the axial rake angle was −1° were prepared.

A general-purpose cutting insert having a model number AOMT11T308PEER-G manufactured by Sumitomo Electric Hard Metal Co., Ltd. was used as the cutting insert.
<Test Method>

As cutting conditions, the rotation speed was set to 200 m/min, the feed amount was set to 0.1 mm/blade, the axial cutting amount was set to 15 mm, and the radial cutting amount was set to 2 mm. The tool protrusion length was 63 mm from the holder.

As the cutting method, the downcutting method was adopted similarly to the example 1. The oil supply method at the time of cutting was dry.

The workpiece was cut using the tool 1 and the tool 2 under the above cutting conditions. Then, the size of the burr on the upper surface of the workpiece was compared.

<Result>

The generation of the visually-checked burrs was prevented in the case of using the tool 2 than in the case of using the tool 1. Thus, it was illustrated that the burrs were prevented by reducing the axial rake angle.

It should be understood that the first and second embodiments disclosed herein are illustrative in all respects and are not restrictive. The basic scope of the present invention is defined not by the first and second embodiments but by the claims, and is intended to include meanings equivalent to the claims and all modifications within the scope.

REFERENCE SIGNS LIST

1: cutting tool, 2: fixing hole, 2a, 10daa, 10dba: center, 10: main body, 10a: rotation axis, 10b: distal end surface, 10c: rear end surface, 10d: installation surface. 10da: first installation surface, 10db: second installation surface, 10e: side surface, 10ea: start point, 10eb: end point, 20: groove, 20a: first groove, 20b: second groove. 20ba: intersection, 20c: third groove, 21: edge, 21a first region, 21b: second region, 24: side wall upper end, 24a: first point, 24b: second point, 25, 55: line segment, 30; 20 fixing screw, 50: cutting insert, 50a: cutting edge, 50b; rake surface, 50c: flank surface, 51: first cutting insert, 52: second cutting insert, 53: third cutting insert, 54: fourth cutting insert, 56: fifth cutting insert, 57: sixth cutting insert, 100: workpiece, 101: axial cutting amount, 102: radial cutting amount, 201, 201a: distal end-side groove, 202, 202a: rear end-side groove, L1: first length, L2: second length, RD: rotation direction, W1: first width, W2: second width, θ1, θ2: central angle, θ3: groove angle, θ4: insert disposition angle, θ5: first axial rake angle, θ6: second axial rake angle

The invention claimed is:

1. A cutting tool rotatable about a rotation axis, the cutting tool comprising a main body that includes a distal end surface, a side surface continuous to the distal end surface, and a rear end surface that is continuous to the side surface and is located on a side opposite to the distal end surface in a direction along the rotation axis, wherein a spiral first groove and a spiral second groove are formed on the side surface of the main body, the second groove is adjacent to a rear side in a rotation direction of the main body when viewed from the first groove, the first groove has at least four installation surfaces inside the first groove, the at least four installation surfaces are used to install a cutting insert, the at least four installation surfaces include a first installation surface and a second installation surface that are disposed third or later from the distal end surface side of the main body, the first installation surface is located on a most rear end surface side among the at least four installation surfaces, the second installation surface is located closer to the distal end surface than the first installation surface, the at least four installation surfaces have fixing holes fixing the cutting insert, respectively, a center of each of the fixing holes on the at least four installation surfaces is set to a center of each of the at least four installation surfaces, and when an intersection of the side surface and a semi-straight line is set to a first start point, the semi-straight line passing through the center of the first installation surface and extending toward an outside of the side surface with the rotation axis as a start point, in a first section that passes through the center of the first installation surface and is perpendicular to the rotation axis, when an intersection between a side wall of the second groove on the first groove side and the side surface in the first section is set to a first end point, when a length of the side surface of the main body from the first start point to the first end point in the first section is set to a first length, when an intersection of the side surface and a semi-straight line is set to a second start point, the semi-straight line passing through the center of the second installation surface and extends toward an outside of the side surface with the rotation axis as a start point, in a second section passing through the center of the second installation surface and perpendicular to the rotation axis, when an intersection between a side wall of the second groove on the first groove side and the side surface in the second section is set to a second end point, and when a length of the side surface of the main body from the second start point to the second end point in the second section is set to a second length, the first length is longer than the second length.

2. The cutting tool according to claim 1, wherein when the main body is viewed from a direction that is perpendicular to the rotation axis and is parallel to the second installation surface, an angle formed by the rotation axis and a line segment connecting the center of the first installation surface and the center of the second installation surface is set to an insert disposition angle, and an angle formed by the rotation axis and a line segment connecting a first point and a second point at a sidewall upper end of the first groove located on a front side in the rotation direction with respect to the first installation surface is set to a groove angle, the center of the first installation surface and a position of the first point in a direction along the rotation axis are identical and the center of the second installation surface and a position of the second point in the direction along the rotation axis are identical, and the groove angle is larger than the insert disposition angle.

3. The cutting tool according to claim 1, wherein a shortest distance from the center of the first installation surface to a sidewall upper end of the first groove is set to a first width, the sidewall upper end of the first groove being located on the front side in the rotation direction of the main body with respect to the first installation surface, when the main body is viewed from a direction that is perpendicular to the rotation axis and is parallel to the first installation surface, and a shortest distance from the center of the second installation surface to the sidewall upper end of the first groove is set to a second width when the main body is viewed from a direction perpendicular to the rotation axis and parallel to the second installation surface, and the first width is smaller than the second width.

4. The cutting tool according to claim 1, further comprising at least four cutting inserts that are disposed inside the first groove and are disposed on the at least four installation surfaces, respectively, wherein the at least four cutting inserts include a first cutting insert and a second cutting insert, the first cutting insert is installed on the first installation surface, the second cutting insert is installed on the second installation surface, each of the at least four cutting inserts includes a rake surface facing the front side in the rotation direction in the main body and a flank surface continuous to the rake surface on the side surface side of the main body, a ridgeline of each of the rake surface and the flank surface is a cutting edge, an angle formed between a tangent on the distal end surface side of the cutting edge of the first cutting insert and the rotation axis is set to a first axial rake angle when the main body is viewed from a direction that is perpendicular to the rotation axis and is parallel to the first installation surface, and an angle formed by a tangent on the distal end surface side of the cutting edge of the second cutting insert and the rotation axis is set to a second axial rake angle when the main body is viewed from a direction that is perpendicular to the rotation axis and is parallel to the second installation surface, and the first axial rake angle is smaller than the second axial rake angle.

5. The cutting tool according to claim 1, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

6. The cutting tool according to claim 2, wherein a shortest distance from the center of the first installation surface to a sidewall upper end of the first groove is set to a first width, the sidewall upper end of the first groove being located on the front side in the rotation direction of the main body with respect to the first installation surface, when the main body is viewed from a direction that is perpendicular to the rotation axis and is parallel to the first installation surface, and a shortest distance from the center of the second installation surface to the sidewall upper end of the first groove is set to a second width when the main body is viewed from a direction perpendicular to the rotation axis and parallel to the second installation surface, and the first width is smaller than the second width.

7. The cutting tool according to claim 2, further comprising at least four cutting inserts that are disposed inside the first groove and are disposed on the at least four installation surfaces, respectively, wherein the at least four cutting inserts include a first cutting insert and a second cutting insert, the first cutting insert is installed on the first installation surface, the second cutting insert is installed on the second installation surface, each of the at least four cutting inserts includes a rake surface facing the front side in the rotation direction in the main body and a flank surface continuous to the rake surface on the side surface side of the main body, a ridgeline of each of the rake surface and the flank surface is a cutting edge, an angle formed between a tangent on the distal end surface side of the cutting edge of the first cutting insert and the rotation axis is set to a first axial rake angle when the main body is viewed from a direction that is perpendicular to the rotation axis and is parallel to the first installation surface, and an angle formed by a tangent on the distal end surface side of the cutting edge of the second cutting insert and the rotation axis is set to a second axial rake angle when the main body is viewed from a direction that is perpendicular to the rotation axis and is parallel to the second installation surface, and the first axial rake angle is smaller than the second axial rake angle.

8. The cutting tool according to claim 3, further comprising at least four cutting inserts that are disposed inside the first groove and are disposed on the at least four installation surfaces, respectively, wherein the at least four cutting inserts include a first cutting insert and a second cutting insert, the first cutting insert is installed on the first installation surface, the second cutting insert is installed on the second installation surface, each of the at least four cutting inserts includes a rake surface facing the front side in the rotation direction in the main body and a flank surface continuous to the rake surface on the side surface side of the main body, a ridgeline of each of the rake surface and the flank surface is a cutting edge, an angle formed between a tangent on the distal end surface side of the cutting edge of the first cutting insert and the rotation axis is set to a first axial rake angle when the main body is viewed from a direction that is perpendicular to the rotation axis and is parallel to the first installation surface, and an angle formed by a tangent on the distal end surface side of the cutting edge of the second cutting insert and the rotation axis is set to a second axial rake angle when the main body is viewed from a direction that is perpendicular to the rotation axis and is parallel to the second installation surface, and the first axial rake angle is smaller than the second axial rake angle.

9. The cutting tool according to claim 6, further comprising at least four cutting inserts that are disposed inside the first groove and are disposed on the at least four installation surfaces, respectively, wherein the at least four cutting inserts include a first cutting insert and a second cutting insert, the first cutting insert is installed on the first installation surface, the second cutting insert is installed on the second installation surface, each of the at least four cutting inserts includes a rake surface facing the front side in the rotation direction in the main body and a flank surface continuous to the rake surface on the side surface side of the main body, a ridgeline of each of the rake surface and the flank surface is a cutting edge, an angle formed between a tangent on the distal end surface side of the cutting edge of the first cutting insert and the rotation axis is set to a first axial rake angle when the main body is viewed from a direction that is perpendicular to the rotation axis and is parallel to the first installation surface, and an angle formed by a tangent on the distal end surface side of the cutting edge of the second cutting insert and the rotation axis is set to a second axial rake angle when the main body is viewed from a direction that is perpendicular to the rotation axis and is parallel to the second installation surface, and the first axial rake angle is smaller than the second axial rake angle.

10. The cutting tool according to claim 9, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

11. The cutting tool according to claim 2, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

12. The cutting tool according to claim 3, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

13. The cutting tool according to claim 4, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

14. The cutting tool according to claim 5, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

15. The cutting tool according to claim 10, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

16. The cutting tool according to claim 11, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

17. The cutting tool according to claim 12, wherein the first groove intersects the distal end surface, an edge of the first groove in the distal end surface has a curved shape protruding toward the rotation axis side, the edge includes a first region located on a side closer to the at least four installation surfaces and a second region located on a side farther from the at least four installation surfaces than the first region, and a curvature of the first region is larger than a curvature of the second region.

\* \* \* \* \*